(12) United States Patent
Chang-Hasnain et al.

(10) Patent No.: US 10,114,238 B2
(45) Date of Patent: Oct. 30, 2018

(54) ACTIVELY CONTROLLABLE COLOR USING HIGH CONTRAST METASTRUCTURES

(71) Applicant: THE REGENTS OF THE UNIVERSITY OF CALIFORNIA, Oakland, CA (US)

(72) Inventors: Connie Chang-Hasnain, Palo Alto, CA (US); Li Zhu, Richmond, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 292 days.

(21) Appl. No.: 15/215,112

(22) Filed: Jul. 20, 2016

(65) Prior Publication Data

US 2017/0023807 A1 Jan. 26, 2017

Related U.S. Application Data

(60) Provisional application No. 62/195,084, filed on Jul. 21, 2015.

(51) Int. Cl.
*G02F 1/01* (2006.01)
*G02F 1/23* (2006.01)
(Continued)

(52) U.S. Cl.
CPC .......... *G02F 1/0131* (2013.01); *G02B 1/002* (2013.01); *G02B 5/1809* (2013.01);
(Continued)

(58) Field of Classification Search
CPC ...... G02F 1/0131; G02F 1/002; G02F 1/0072; G02F 1/0128; G02F 2202/30; G02B 5/1809; G02B 26/0808
(Continued)

(56) References Cited

U.S. PATENT DOCUMENTS 9,482,887 B2 * 11/2016 Horie ................. G02F 1/017
9,525,084 B2 * 12/2016 Wang ................. H01L 27/1443
(Continued)

OTHER PUBLICATIONS

Zhu, Li et al., "Flexible photonic metastructures for tunable coloration", Optica, vol. 2, No. 3, Mar. 12, 2015, pp. 255-258.
(Continued)

*Primary Examiner* — William R Alexander
*Assistant Examiner* — Tamara Y Washington
(74) *Attorney, Agent, or Firm* — O'Banion & Ritchey LLP; John P. O'Banion

(57) ABSTRACT

A color changing or beam steering photonic device, which combines a high contrast metastructure (HCM) having a plurality of high index grating structures, into a low index membrane. In response to physical (or electrical) deformation of the membrane the low index gaps between adjacent grating bars changes which results in changing reflectance and transmission angles for steering a single wavelength of light and for causing a color change in said photonic device when subject to multiple light wavelengths. Deformation can result from direct physical stimulus, conversion from electrical or thermal to physical, and so forth. Refractive index change can also be initiated by carrier injection through electrodes. The apparatus is exemplified for use in color displays, beam steering, labeling micro entities, mechanical deformation sensing, camouflage, anti-counterfeiting, and other fields.

20 Claims, 19 Drawing Sheets

(51) Int. Cl.
  *G02F 1/00* (2006.01)
  *G02B 1/00* (2006.01)
  *G02B 5/18* (2006.01)
  *G02B 26/08* (2006.01)
(52) U.S. Cl.
  CPC ....... *G02B 26/0808* (2013.01); *G02F 1/0072* (2013.01); *G02F 1/0128* (2013.01); *G02F 1/23* (2013.01); *G02F 2202/30* (2013.01)
(58) Field of Classification Search
  USPC .................................. 359/240–289; 706/45
  See application file for complete search history.

(56) References Cited

U.S. PATENT DOCUMENTS

| | | | | |
|---|---|---|---|---|
| 9,693,715 | B2* | 7/2017 | Liu | H01L 31/18 |
| 9,973,283 | B2* | 5/2018 | Sorin | H04B 10/802 |
| 2011/0280533 | A1* | 11/2011 | Chang-Hasnain | B82Y 20/00 |
| | | | | 385/131 |
| 2015/0369976 | A1* | 12/2015 | Magnusson | G02B 5/1861 |
| | | | | 359/572 |
| 2016/0033755 | A1* | 2/2016 | Horie | G02B 26/02 |
| | | | | 359/230 |
| 2016/0126381 | A1* | 5/2016 | Wang | H01L 31/035227 |
| | | | | 257/429 |
| 2017/0010482 | A1* | 1/2017 | Mathai | G02F 1/0102 |
| 2017/0082786 | A1* | 3/2017 | Magnusson | G02B 5/1861 |

OTHER PUBLICATIONS

Zhu, Li et al., "Flexible photonic metastructures for tunable coloration: supplementary material", Optica, vol. 2, No. 3, Mar. 12, 2015, pp. 1-3.
C. J. Chang-Hasnain and W. Yang, "High-contrast gratings for integrated optoelectronics," Advances in Optics and Photonics, vol. 4, issue 3, pp. 379-440, 2012.
W. Yang, "High-contrast gratings for integrated optoelectronics", University of California, Berkeley, Technical Report No. UCB/EECS-2014-197, pp. 1-146, Dec. 1, 2014, downloaded on Jul. 20, 2016 from http://www.eecs.berkeley.edu/Pubs/TechRpts/2014/EECS-2014-197.pdf.

* cited by examiner

ACTIVELY CONTROLLABLE COLOR USING HIGH CONTRAST METASTRUCTURES

CROSS-REFERENCE TO RELATED APPLICATIONS

This application claims priority to, and the benefit of, U.S. provisional patent application Ser. No. 62/195,084 filed on Jul. 21, 2015, incorporated herein by reference in its entirety.

STATEMENT REGARDING FEDERALLY SPONSORED RESEARCH OR DEVELOPMENT

This invention was made with Government support under Grant Number N00244-09-1-0013 awarded by the Navy Post Graduate School. The Government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to a color changing material, and more particularly to a flexible membrane incorporating a high contrast metastructure configured for changing color in response to deformation of the flexible membrane.

2. Background Discussion

The ability to actively change object color is highly desirable in a variety of applications, including: sensing, anti-counterfeit, camouflage, jewelry, visual arts, and so forth. Conventional optical coating consists of one or multiple layers of thin films, relying on accumulative optical interference of the layers. It is used to provide high reflection or transmission for a designed wavelength band. However, these traditional coating methods do not provide means to actively control color.

Accordingly, a need exists for active color changing devices which are readily implemented. The teachings of the present disclosure fulfill these needs while overcoming the shortcomings of prior devices.

BRIEF SUMMARY

The technology of this disclosure is a novel color-controlled membrane utilizing a high contrast metastructure (HCM). By designing the HCM dimension to be larger but close to one wavelength, it can display different colors. Typically, the period of the structure is smaller than five (5) times the wavelength of interest. The color of the membrane can be changed with the change of the period of its HCM, either by active actuation or passive stimulation. The active color display is promising for providing camouflage and color coating in visual arts. The color change from passive stimulation is useful to label the mechanical change in visible wavelength resolution. In addition, this device can be used as a beam-steering device for a fixed wavelength.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Introduction to a Color Changing Membrane

Conventional diffraction from a periodic structure causes the light waves to split into multiple orders, having its peak power concentrated in the $0^{th}$ order. The diffraction angle of the $0^{th}$ order follows Snell's Law and is independent from optical wavelength. Thus, conventional diffraction at the $0^{th}$ order cannot be utilized as a color splitting mechanism. However, the colors can be spatially split utilizing higher orders of diffraction, yet the optical power in these higher orders is significantly reduced.

The present disclosure utilizes a high contrast metastructure (HCM), which is a high refractive index metastructure surrounded by the low index material. The geometries of HCM are close to the optical wavelength of the incident light of interest, and its use allows engineering the light propagation in subwavelength resolution by taking advantage of the lithography fabrication technologies. Use of HCM has been proven to provide ultra-broad band high reflectivity in the $0^{th}$ order. In the present disclosure, the HCM is utilized with periodicity larger than one-wavelength in air for wavelengths of interests. In particular, HCM is designed and utilized herein to concentrate its transmitted or reflected power in a high diffraction order to provide an efficient, broadband tunable color splitting device. Furthermore, according to the present disclosure color can be changed for a particular viewing angle by changing the period of the HCM.

It should be appreciated that the present disclosure is applicable to any electromagnetic wavelength, depending on the availability of material suited to that wavelength regime. In particular, the apparatus hold promise for use from ultra-violet to near-infrared, from tens of nanometers up to about ten microns, with the visible spectrum being included (approximately 400 nm to 800 nm).

2. Embodiments of Color Changing Membrane

Figure 1A:
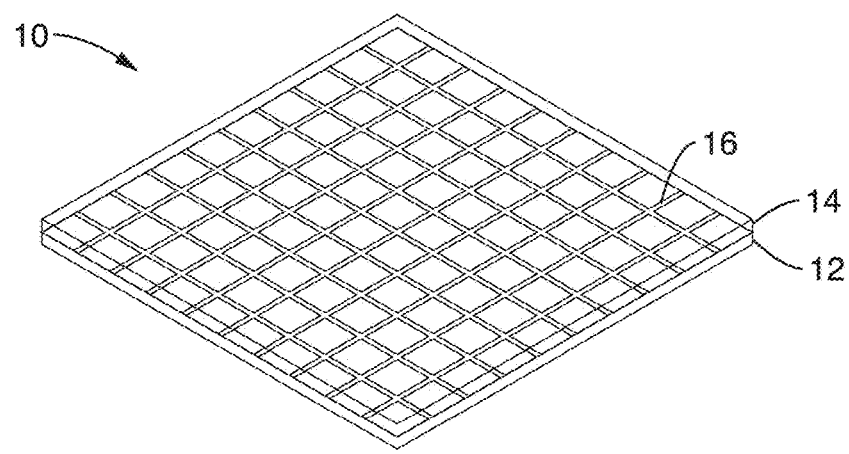
FIG. 1A is a pictorial view of a color controlling membrane, according to an embodiment of the present disclosure.

FIG. 1A illustrates an example embodiment 10 of a color changing membrane having a lower transparent layer 12, upper transparent layer 14 and an embedded HCM layer 16 between the other two layers. The HCM is embedded inside the flexible transparent thin film.

Figure 1B:
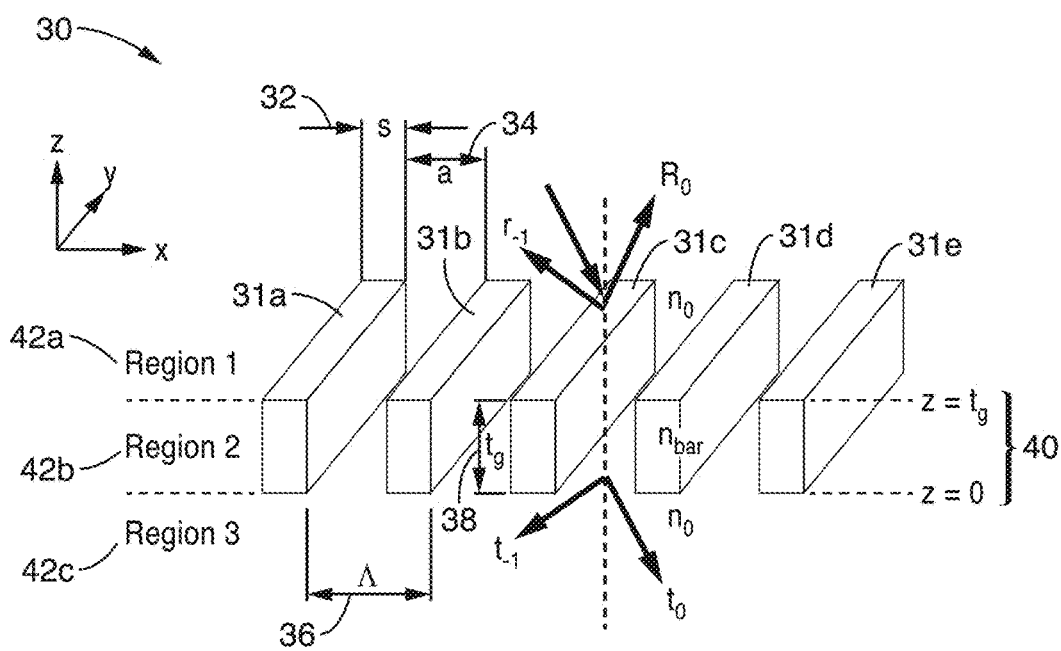
FIG. 1B is a schematic view of an HCM utilized within a color controlling membrane according to an embodiment of the present disclosure.

FIG. 1B illustrates diffraction 30 on an HCM as utilized in the present disclosure. By way of example and not limitation the HCM comprises a plurality of grating bars 31a through 31e of high index material, each having a width (s) 32, and a low index gap (spacing between bars) (a) 34 and a periodicity (Λ) 36. The period is Λ=s+a, with a duty cycle of $$\eta = \frac{s}{\Lambda}.$$

The thickness is defined as $t_g$. Grating bars are shown with a thickness ($t_g$) 38, with top and bottom shown 40. The bottom of the bar is considered at a Z axis position of zero (0), while the top of the bar is at the Z axis position of ($t_g$). The regions of interest are marked in the figure as 42a Region 1, 42b Region 2, and 42c Region 3. Region 1 is the region above the HCM top interface and Region 3 is the region below the HCM bottom interface, these regions comprise the surrounding medium within which the HCM structure of Region 2 operates. The figure depicts refractive index n of the grating bars as $n_{bar}$, and the surrounding medium as $n_0$. The grating bars are typically of a high index material, while the surrounding medium is low index, which is typically air, water, or a low index material such as glass, polymer, and so forth. It will be noted that the index of the grating bars should be greater than approximately 1.5 that of the surrounding material, while the HCM achieves best performance characteristics when the index of the grating bars is at least twice that of the surrounding media (e.g., $n_{bar} > 2n_0$).

The diffraction can be calculated by the grating equation $\Lambda(\sin \theta_i + \sin \theta_m) = m\lambda$ where m=0, ±1, ±2, ... and so forth. When the period is very close to the optical wavelength ($\Lambda \Box \lambda$), then there exists a range where only $-1^{st}$ order and $0^{th}$ order have propagation diffraction, defined as $R_{-1}$, $R_0$ for reflection, as seen in the top portion of the figure, and $T_{-1}$, $T_0$ for transmission as seen at the bottom portion of the figure. By engineering the interference of the diffraction orders the disclosed apparatus concentrates light power into a high diffraction order. It should be appreciated that the figure above is shown by way of example and not limitation, as any number of grating bar configurations can be utilized, including various geometries, without departing from the teachings of the present disclosure.

Figure 2A:
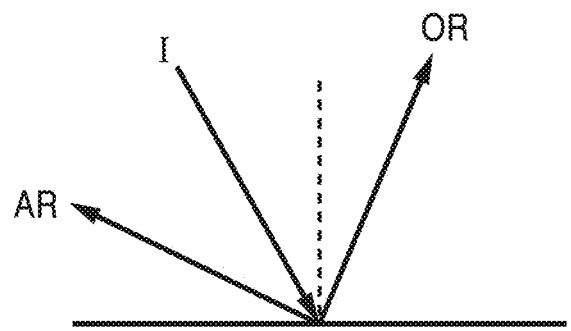
FIG. 2A and FIG. 2B are ray diagrams of anomalous reflection and refraction which are utilized according to an embodiment of the present disclosure.
Figure 2B:
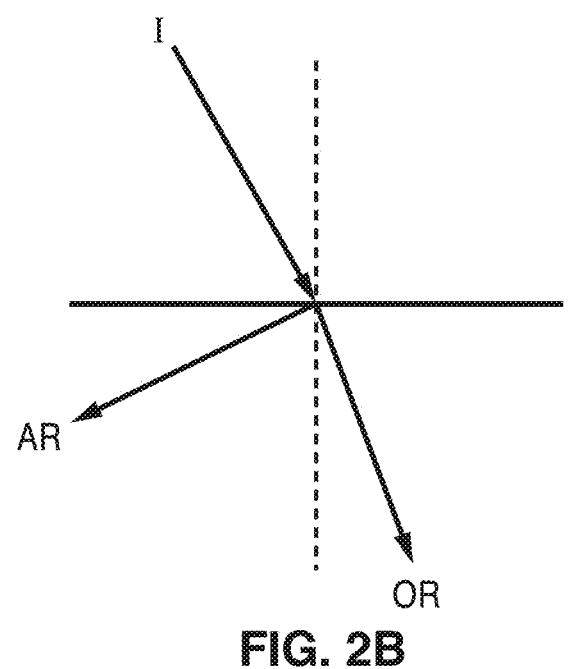

FIG. 2A and FIG. 2B illustrate a unique anomalous reflection and refraction property utilized according to the present disclosure. In FIG. 2A, incident light (I) is reflected into an abnormal reflection (AR) angle instead of the ordinary reflection (OR) angle. The diffraction light is concentrated in the $R_{-1}$ order, with the power in other orders being canceled (fully or substantially canceled out). The same phenomenon also applies to the transmission orders shown in FIG. 2B depicting an anomalous refraction phenomenon. Using these metastructure configurations colors can be split spatially in −1 diffraction order while the optical power is still efficiently maintained.

Figure 3A:
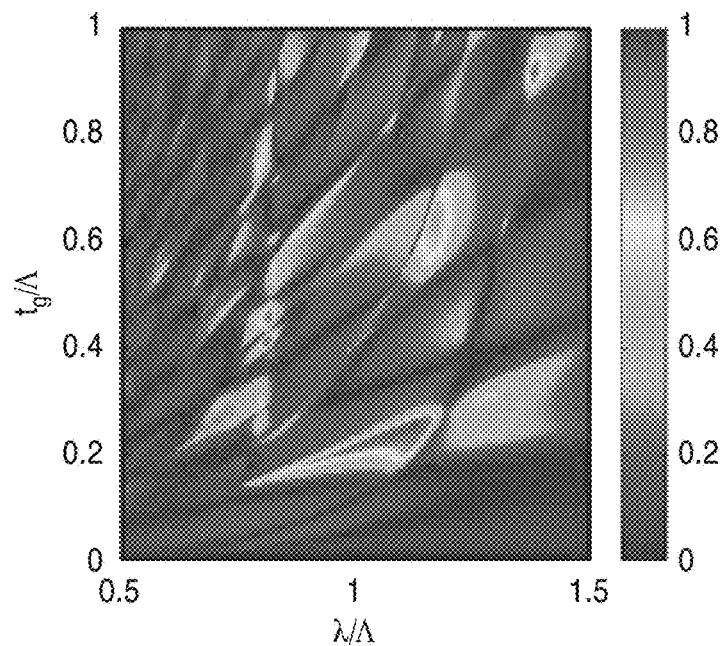
FIG. 3A and FIG. 3B are diffraction efficiency plots of the $R_{-1}$, as found according to an embodiment of the present disclosure.
Figure 3B:
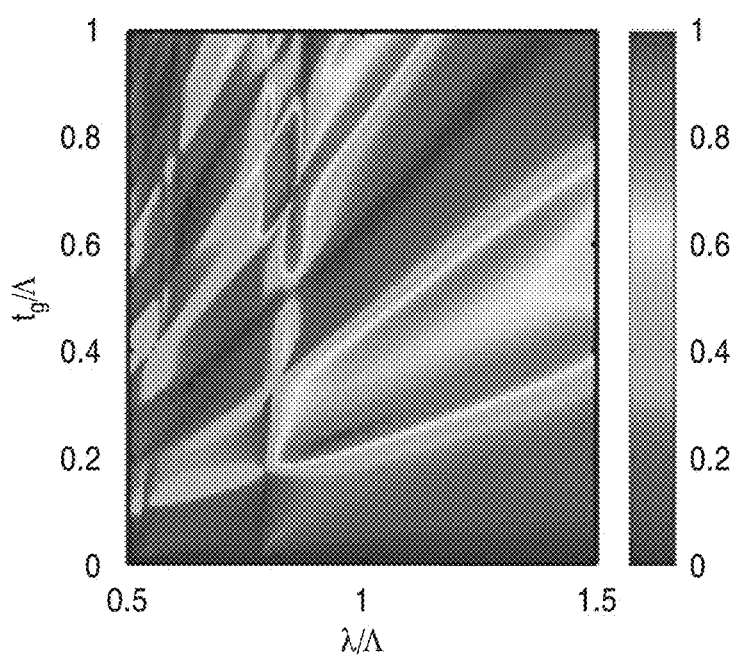

FIG. 3A and FIG. 3B depict examples of $R_{-1}$ order diffraction efficiency of the metastructure, in which the thickness and the period is normalized by the period. The diffraction can be calculated by the method presented in previous work by C. J. Chang-Hasnain and W. Yang, "High-contrast gratings for integrated optoelectronics," Advances in Optics and Photonics, vol. 4, issue 3, pp. 379-440, 2012, incorporated herein by reference in its entirety. The metastructure in this example is made of Silicon. For the reflection type seen in FIG. 3A, the embodiment was configured with a 0.4 duty cycle and 30° incidence angle, with a broadband enhanced $R_{-1}$ being observed. The transmission type example seen in FIG. 3B was configured with a 0.1 duty cycle and 35° incidence angle, with the figure also showing a large $T_{-1}$ enhanced region.

Figure 4A:
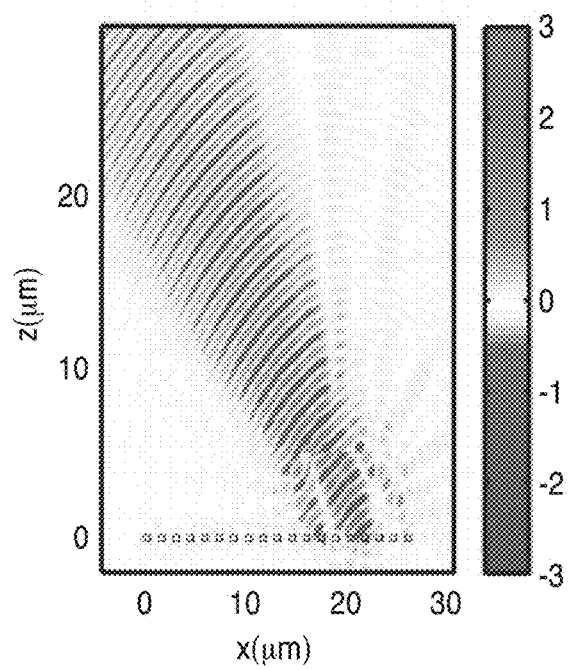
FIG. 4A and FIG. 4B are field profiles of reflection and refraction according to an embodiment of the present disclosure.
Figure 4B:
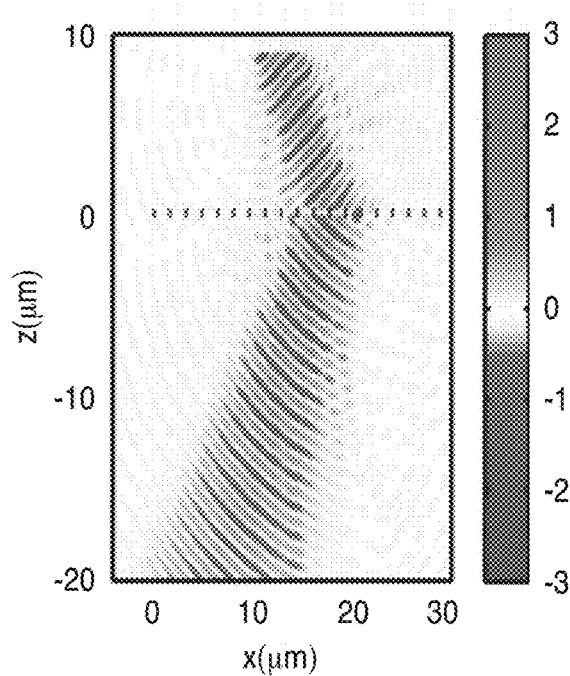

FIG. 4A and FIG. 4B illustrate plots of reflective and refractive field profiles, respectively, which provide verification of anomalous phenomena using a finite-difference-time-domain (FDTD) simulation method, in which it is seen that the optical power is efficiently diffracted into the −1 orders.

When the metastructure is embedded inside the flexible membrane, the period will be changed in response to membrane deformation. In at least one embodiment the high index structure comprise semiconductor materials. The Young's modulus of these semiconductor material is much larger than that of the flexible membrane.

Figure 5:
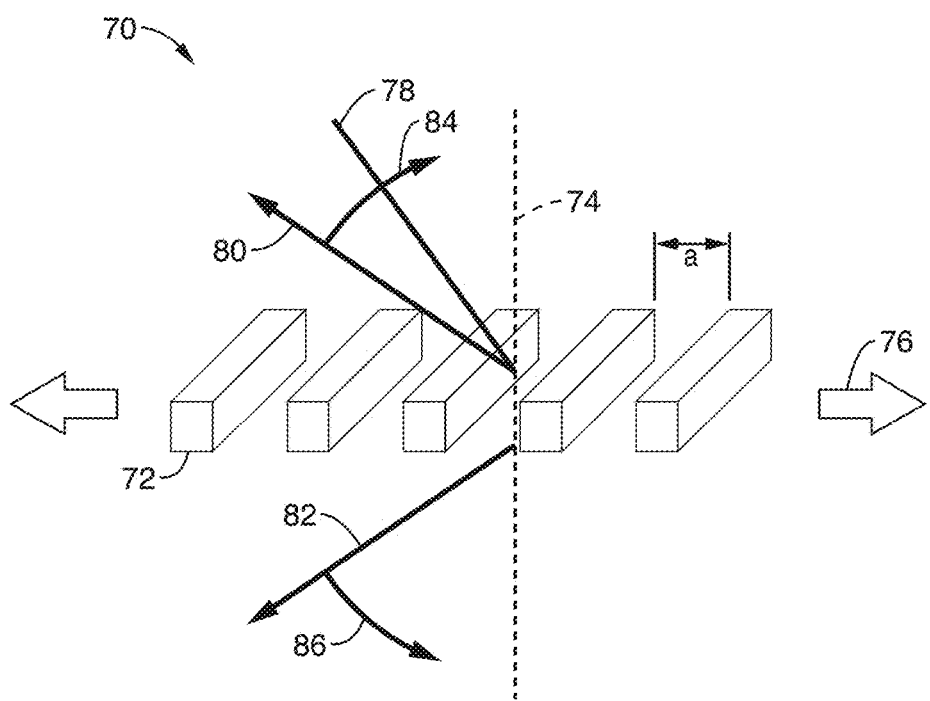
FIG. 5 is a schematic of HCM deformation within a flexible membrane, according to an embodiment of the present disclosure.

FIG. 5 illustrates an embodiment 70 of an HCG 72 operating within a flexible membrane (not shown), to which a compressive or tensile strain 76 is applied (e.g., in the x direction), so that gap width a changes in the low index material while the high index material width s remains constant. For references, a dashed surface normal axis 74 is shown in the figure. From the grating equation $(s+a)(\sin \theta_i + \sin \theta_m) = m\lambda$, the change of a leads to the wavelength changes for the given incidence 78 and observation angles 80, 82, depicted as the change in reflectance and transmission angles 84, 86, thus yielding the color change of the membrane.

Figure 6A:
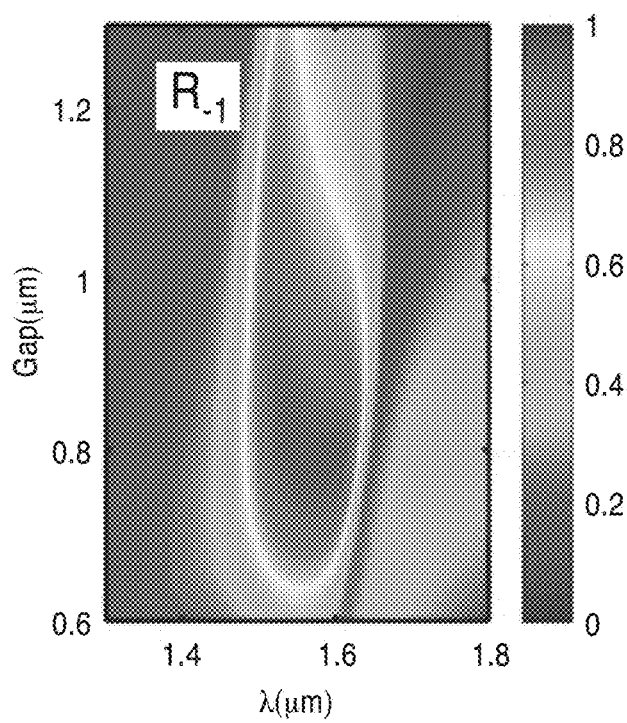
FIG. 6A and FIG. 6B are optical spectrum plots of $R_{-1}$ and $T_{-1}$ with respect to the variation of gap size a, such as seen in FIG. 5, according to an embodiment of the present disclosure.
Figure 6B:
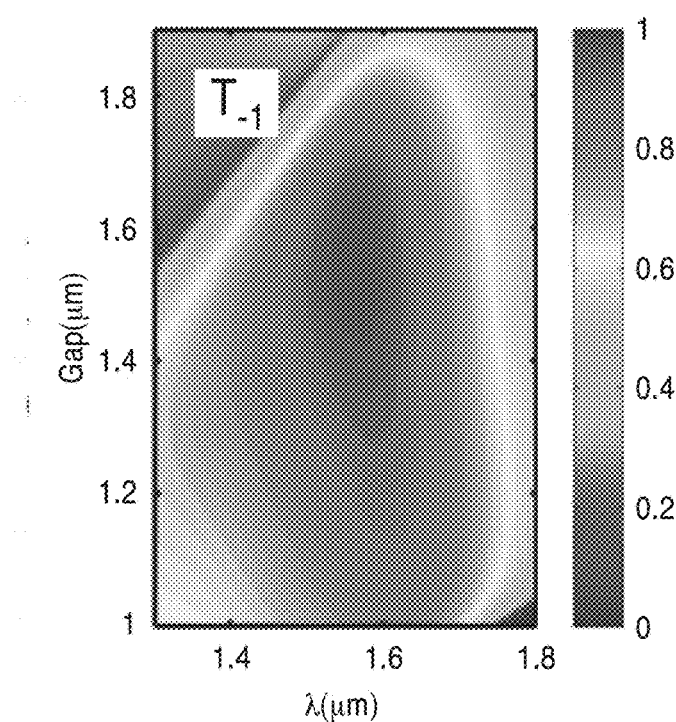

FIG. 6A and FIG. 6B depict optical spectrum from the gap size change for reflectance in FIG. 6A and transmission in FIG. 6B. The metastructures are designed to operate at infrared wavelength. The diffraction in the −1 order still provides very high efficiency while the period is changed by 50%. It will be noted that in the example spectrum of these figure, the efficiency is kept about 80%, while in general the diffraction in the $-1^{st}$ order is considered efficient when it is above about 20%.

Figure 7:
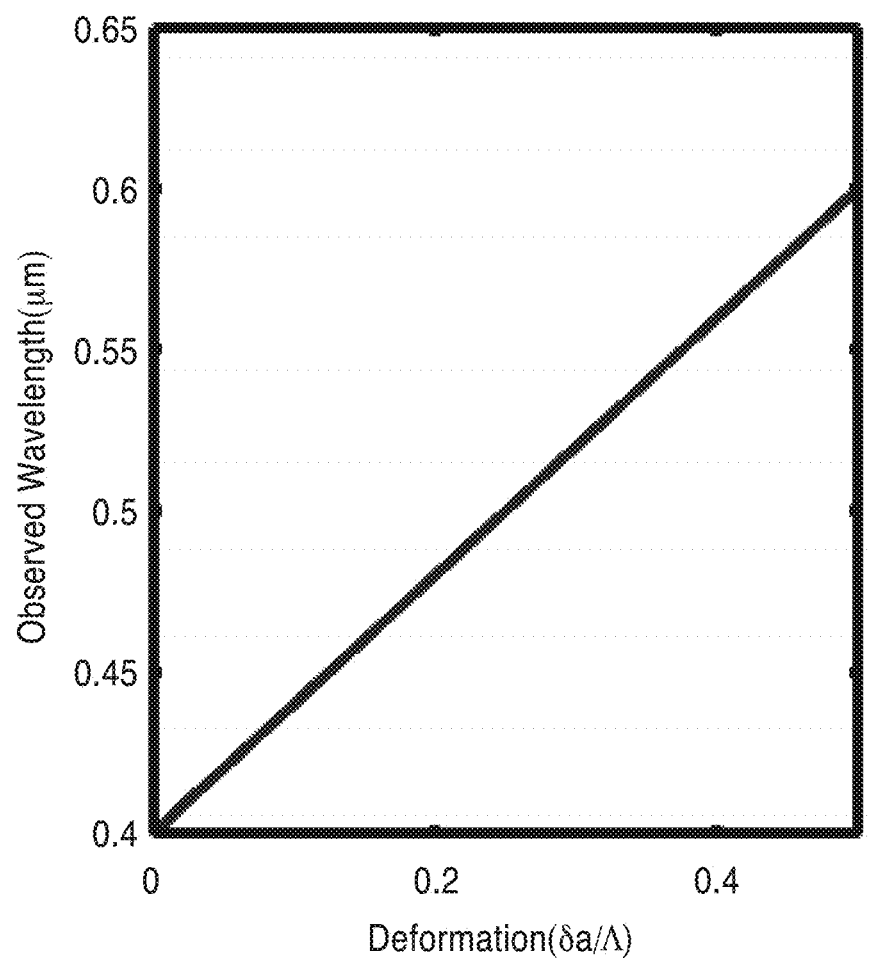
FIG. 7 is a plot of color change results in response to varied deformation of the color controlling membrane metastructure according to an embodiment of the present disclosure.

FIG. 7 illustrates example color change results from the deformation of the flexible membrane retaining the HCM. The plot shows observed wavelength with a given input and output angle in response to varying the deformation of the metastructure. With the extent of stretching reaching 50%, that is to say that a millimeter of the material would stretch to 1.5 millimeters. In this figure the display wavelength is seen to be variable from 400 nm to 610 nm, which covers the visible spectral range from blue to red. On the other hand, for a fixed wavelength illumination, the refractive property change can be utilized for beam steering. According to the grating equation, with fixed $\lambda$ and $\theta_i$, the diffraction angle $\theta_m$ changes with gap size a at high diffraction order (m≠0). As was shown in FIG. 5, when the metastructure is stretched, the diffraction angle becomes smaller in −1 order, making the diffracted light beam rotate towards the surface normal axis.

Figure 8:
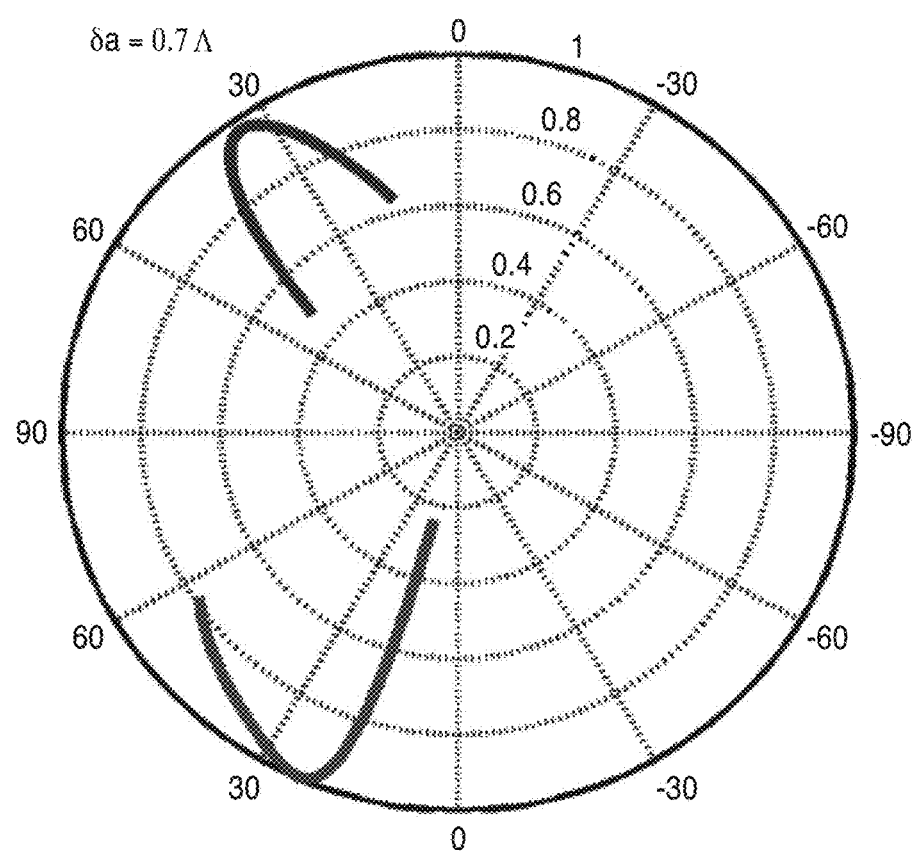
FIG. 8 is a polar plot of diffraction angle and efficiency change with varying gap size, according to an embodiment of the present disclosure.

FIG. 8 illustrates diffraction angle and reflection when the gap size a is varied, and shows efficiency changes. The upper curve represents reflection type and the lower curve represents transmission type. The gap size change is given by δa, which in this example is 70% of the period.

Figure 9A:
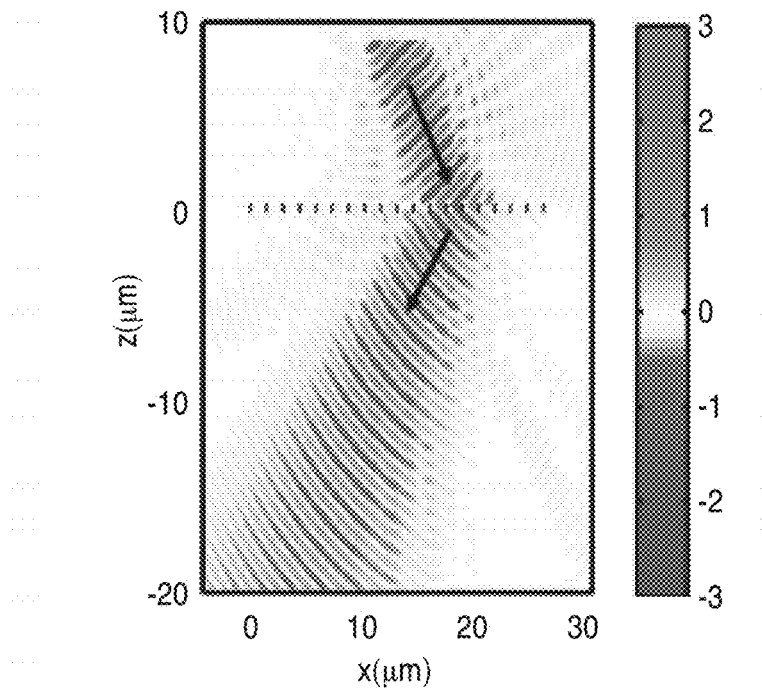
FIG. 9A and FIG. 9B are field profiles for $T_{-1}$ diffraction before and after 20% stretching of the color controlled membrane, according to an embodiment of the present disclosure.
Figure 9B:
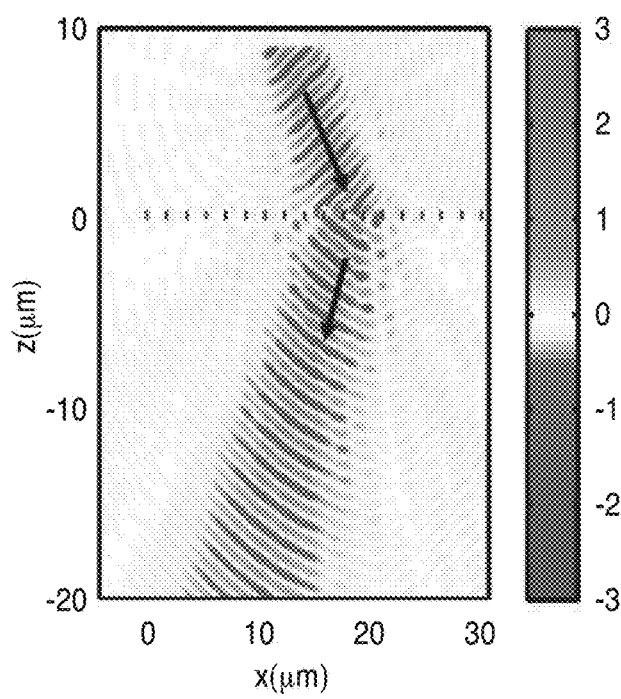

FIG. 9A and FIG. 9B illustrate field profiles for the anomalous refraction with 20% stretching. The output diffraction angle is seen being changed from 41° in FIG. 9A to 26° in FIG. 9B.

3. Fabrication Examples for a Color Changing Membrane

Figure 10A:
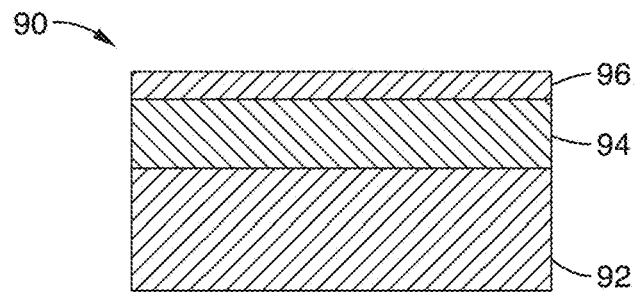
FIG. 10A through FIG. 10H are cross-section views of fabricating a flexible color changing metastructure, according to an embodiment of the present disclosure.
Figure 10B:
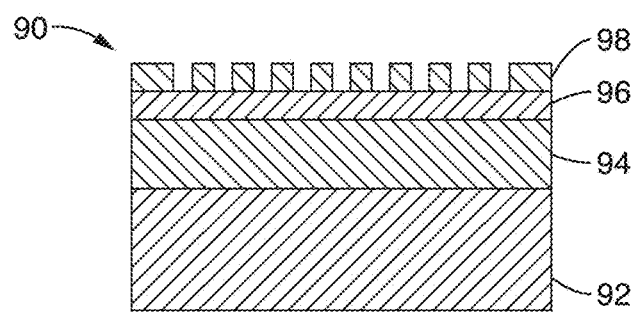
Figure 10C:
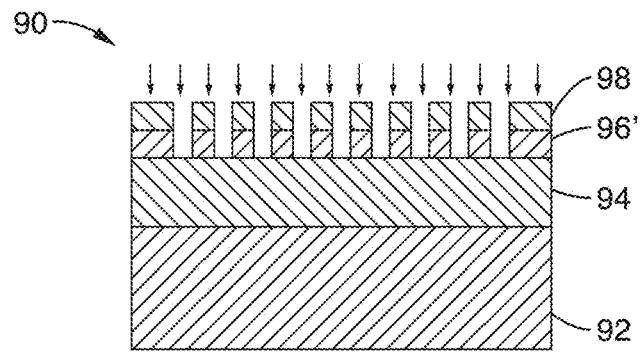
Figure 10D:
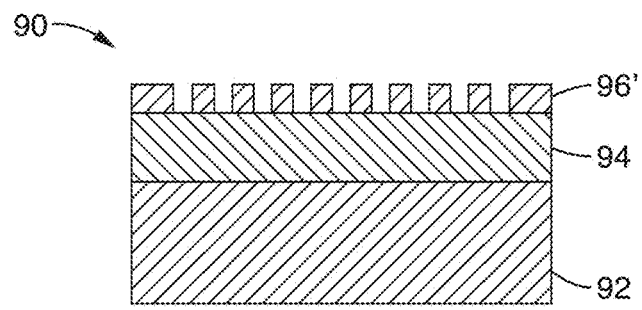

FIG. 10A through FIG. 10H illustrates an example embodiment 90 of fabrication steps for the flexible color changing metastructure membrane. The process starts in FIG. 10A with a semiconductor wafer (substrate) 92 with sacrificial layer 94 under a device layer 96. One common structure with such configuration is the silicon-on-insulator wafer. The semiconductor device layer should have high refractive index, such as Si, Ge, GaAs, InP, InAs, AlSb, or other materials known to have a high index. The sacrificial layer is selectively etched, or otherwise removed to suspend a grating portion of the device layer. Other material combinations with selective etching capabilities can also be utilized, such as InP/AlGaInAs, GaAs/AlGaAs, etc. The first step is to pattern the photoresist 98 on the wafer (device layer), as shown in FIG. 10B. Depending on the critical dimension size, deep ultra-violet (DUV) lithography or ebeam lithography can be utilized. Following the lithography step, an etching step is performed to etch away the exposed area of the device layer, thus defining the metastructure with etching, as illustrated by FIG. 10C, to provide device layer grid 96′. The HCMs are therefore defined with transferring the pattern on the photoresist to the semiconductor layer. In FIG. 10D photoresist 98 is removed.

Figure 10E:
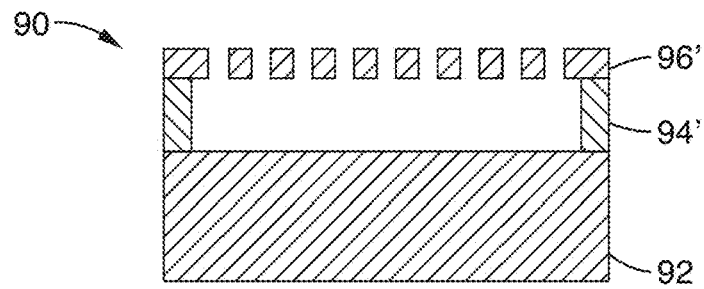
Figure 10F:
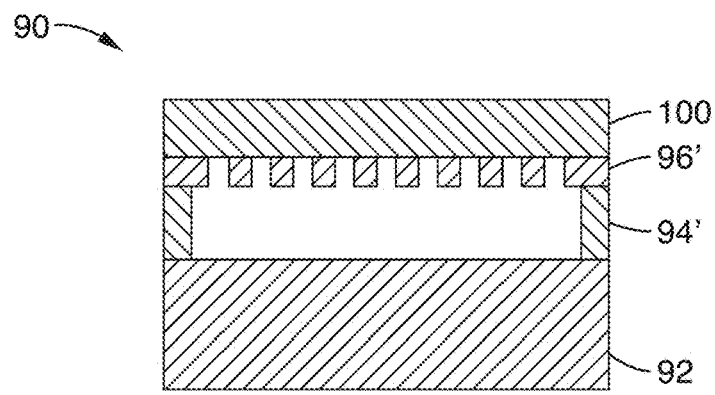
Figure 10G:
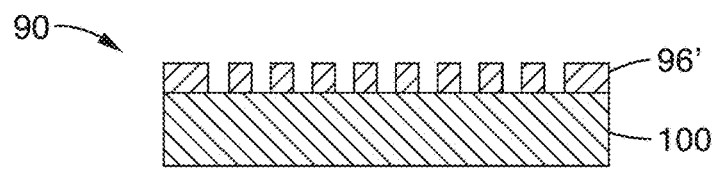
Figure 10H:
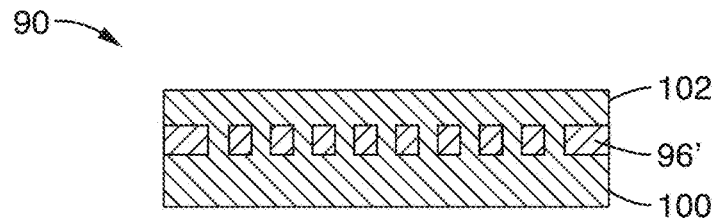

In order to facilitate the transfer of the HCMs to other substrates, the HCM structure is released from the original rigid substrate. FIG. 10E illustrates an example method in which the sacrificial layer under the HCMs is selectively etched, thus suspending the grating bars. FIG. 10F represents the HCM transfer process in which the HCMs 96′ are covered by a flexible carrier membrane layer 100, such as polydimethylsiloxane (PDMS) stamp for transfer. The suspended HCM bars attach to the surface of the PDMS, so by peeling off the PDMS from the rigid substrate, the HCMs are transferred to the flexible PDMS substrate, whose cross section is shown in FIG. 10G with HCMs sitting over the flexible PDMS carrier. Depending on the application, for protection purposes, another step of PDMS coating 102 can be utilized for encapsulating the HCMs inside the PDMS membrane, as shown in FIG. 10H.

The HCM can be designed in a variety of different shapes and geometries of both grating bars and their distribution. For single polarization applications, the HCM can be as simple as straight bars. However, for the considerations of mechanical strength and providing insensitive polarization, two dimensional structures can also be utilized.

FIG. 11A through FIG. 11F illustrates, by way of example and not limitation, a number of example HCM structures. It should be noted that the one dimensional case is generally polarization sensitive, whereas the two dimensional case can be either symmetric to be polarization insensitive or asymmetric to be polarization sensitive.

Figure 11A:
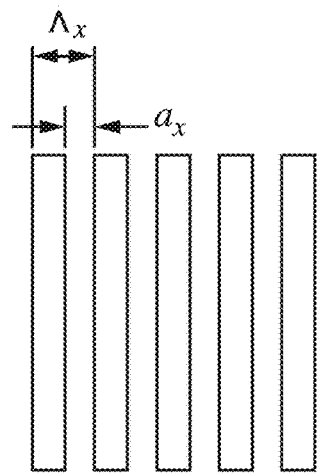
FIG. 11A through FIG. 11F are top views of various one and two dimensional HCM configurations, such as may be utilized according to a color changing membrane embodiment of the present disclosure.
Figure 11B:
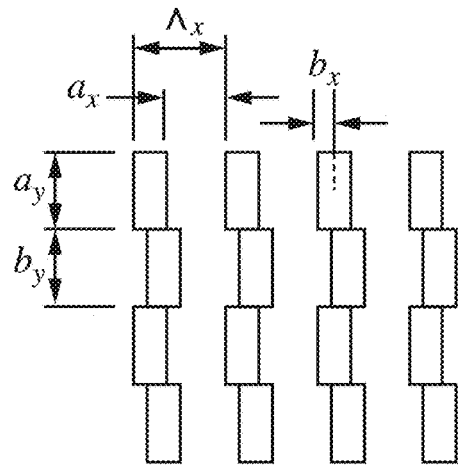
Figure 11C:
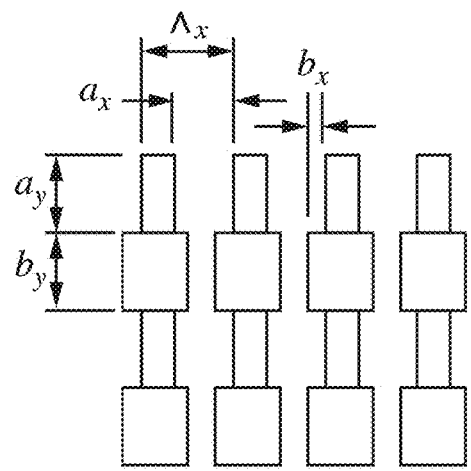

In FIG. 11A through FIG. 11C the grating bars are distributed along a single axis (e.g., x in this example). In FIG. 11A straight bars are shown with wavelength in the x direction of $\Lambda_x$ and spacing (gaps) between the grid bars of $a_x$. In FIG. 11B the bars are separated in the x direction to a period $\Lambda_x$ and segmented in the y direction, with bars of segmented bars of same width but with different (e.g., alternating) offsets in the x direction. There is shown a spacing between grid bars of $a_x$ and a segment offset of $b_x$. The length of the segments is shown as $a_y$ and $b_y$. In FIG. 11C, the bars are segmented with segments of different widths, in the example depicted the bar segments are of two widths. These segmented bars are separated in the x direction to a period $\Lambda_x$ and segmented in the y direction, with segmented bar lengths shown as $a_y$ and $b_y$. A spacing of the narrow bars is shown as $a_x$ while the difference between the width of the narrow bars and the wider bars extends a distance $b_x$. By way of example and not limitation, the embodiment depicts $b_x$ being the same on each side, although embodiments are not limited to this pattern.

Figure 11D:
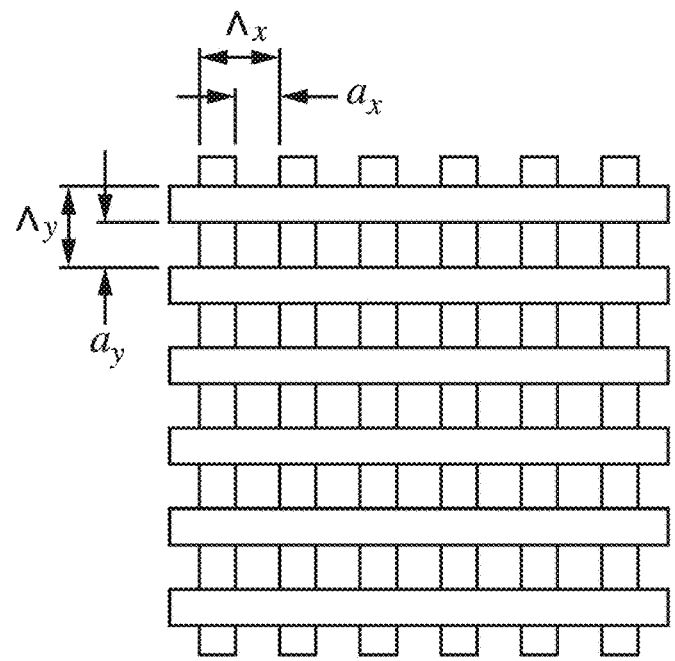
Figure 11E:
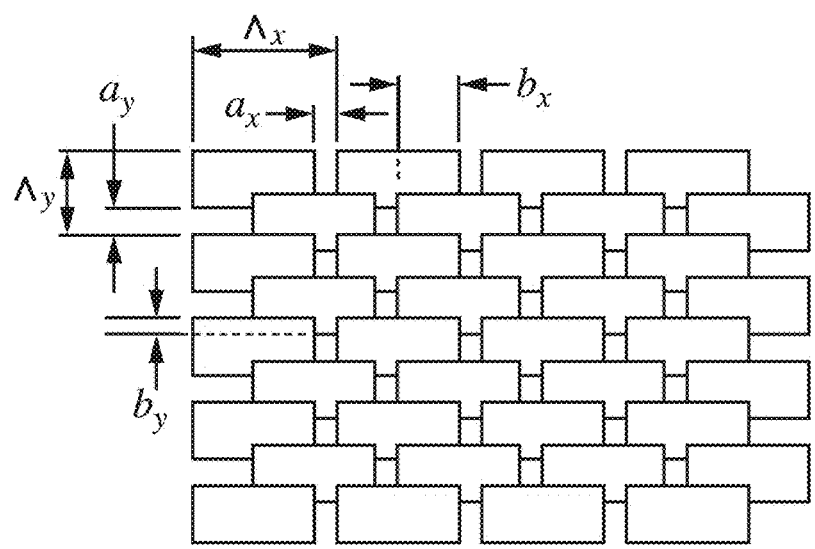
Figure 11F:
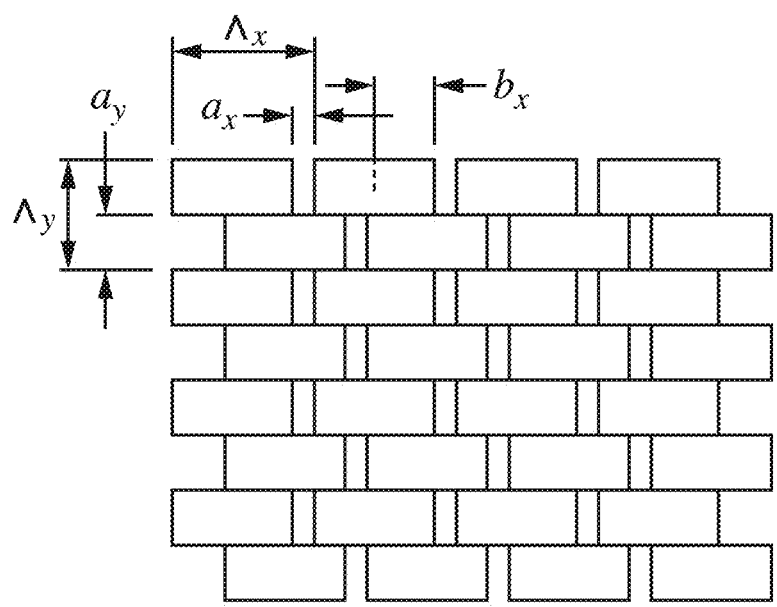

FIG. 11D through FIG. 11F illustrates, by way of example and not limitation, a number of example HCM structures with grating bars distributed on two axes. In FIG. 11D straight bars, which are distributed in a y direction, overlay straight bars distributed in an x direction. The wavelength in the x direction is $\Lambda_x$ with spacing between bars of $a_x$, in the y direction the wavelength is $\Lambda_y$ with spacing between bars of $a_y$. In FIG. 11E grid blocks are shown overlapping in a two dimensional pattern. In this example distribution is shown in the x direction with wavelength $\Lambda_x$ and spacing between bar blocks $a_x$, and overlap between blocks of $b_x$. Similarly, the y direction has wavelength $\Lambda_y$ and spacing between bar blocks $a_y$, and overlap between blocks of $b_y$. In FIG. 11F a similar block grid pattern is shown, but without overlap in the y direction, wherein no $b_y$ value is shown.

Figure 12A:
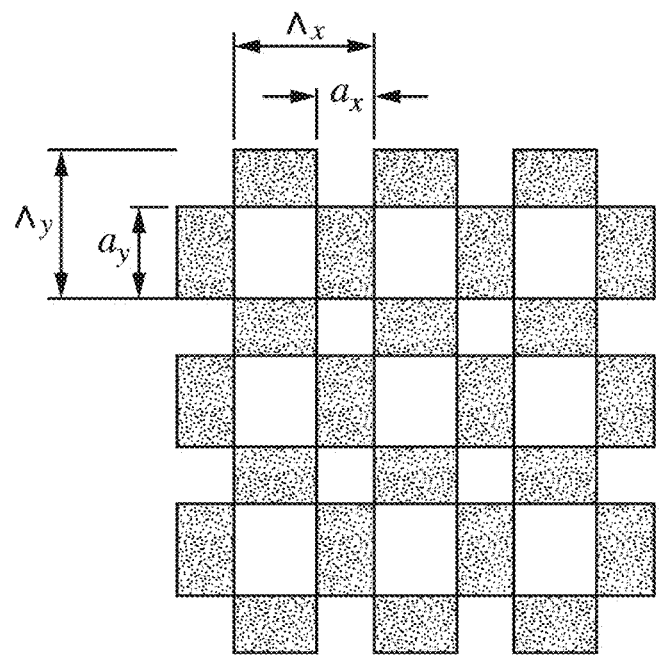
FIG. 12A through FIG. 12C are top views of two dimensional HCM in a non-connected domain, according to an embodiment of the present disclosure.
Figure 12B:
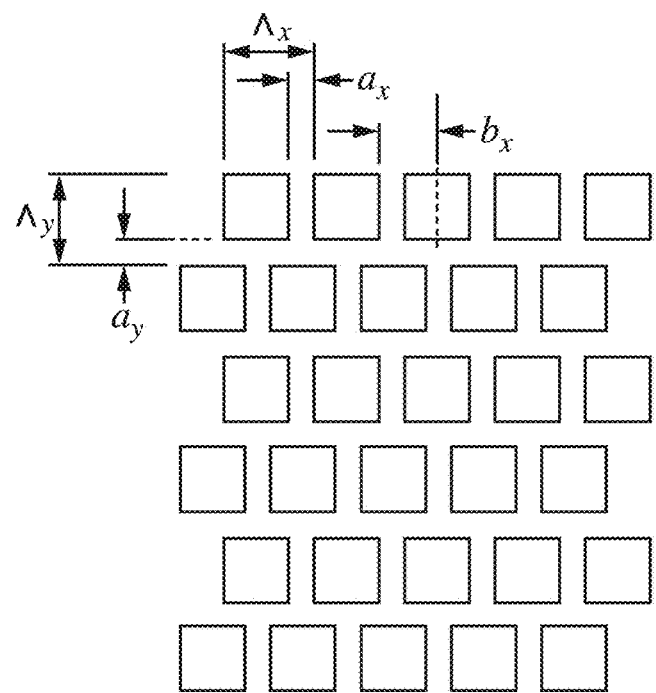
Figure 12C:
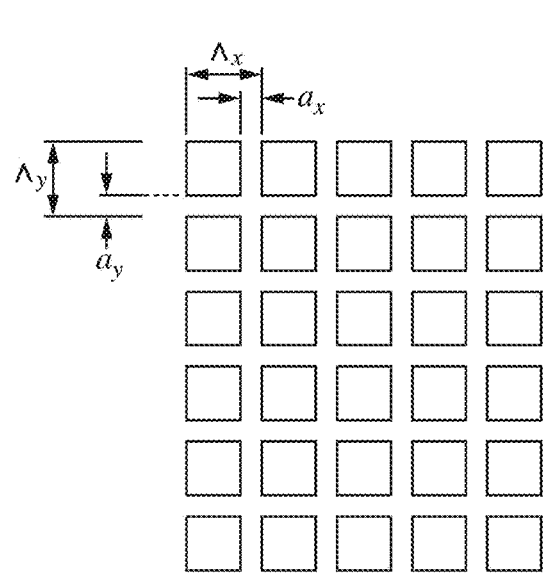

FIG. 12A through FIG. 12C illustrate HCM embodiments which can be fabricated using a well calibrated etching process, in which the HCM can be connected with the substrate with a sharp tip without being fully released. These "sharp tips" comprise at least remnants of a sacrificial layer which has been substantially removed by the etching to substantially free the device layer. It should be appreciated that a number of ways exist for leaving small sacrificial layer tips interconnecting the device layer to the substrate. In FIG. 12A the grating blocks are shown connecting to each other at their tips. By way of example and not limitation the grating bar blocks/bars are depicted with sizes alternating in x and y dimensions. In this example an upper row is shown with wavelength $\Lambda_x$ and spacing between bar blocks $a_x$, while in the y direction the wavelength is $\Lambda_y$ and spacing between bar blocks $a_y$. In FIG. 12B grating blocks are shown separated from one another, and shown here by way of example as being in a staggered configuration. The wavelength is $\Lambda_x$ along the x axis with inter-grate block spacing of $a_x$, and with a stagger offset of $b_x$. In the y direction the wavelength is $\Lambda_y$ with inter-grate block spacing of $a_y$, and there is no stagger in this axis. In FIG. 12C grating blocks are shown separated from one another in the x and y directions in a regular array without stagger, and shown with wavelength $\Lambda_x$ and inter-grate block spacing of $a_x$ in the x direction, with wavelength $\Lambda_y$ and inter-grate block spacing of $a_y$ in the y direction.

Figure 13A:
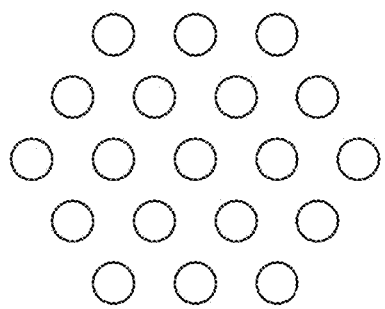
FIG. 13A through FIG. 13D are top views of two dimensional HCM lattice structures, such as utilized according to an embodiment of the present disclosure.
Figure 13B:
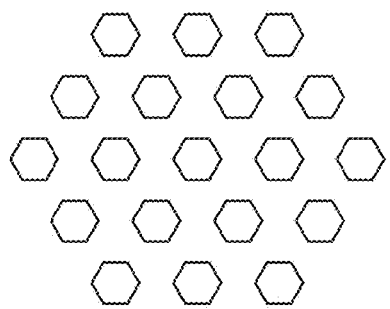
Figure 13C:
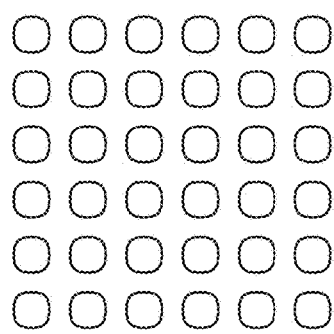
Figure 13D:
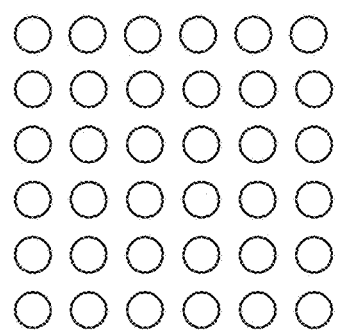

FIG. 13A through FIG. 13D illustrate example embodiments of two dimensional HCM lattice structures, shown by way of example in a hexagonal or rectangular lattice. By way of example and not limitation, the grating bars may be implemented in a variety of shapes and sizes without departing from the teachings of the instant disclosure. In FIG. 13A and FIG. 13B hexagonal patterns are shown with FIG. 13A depicting round grating blocks and FIG. 13B depicting hexagonal grating blocks. In FIG. 13C and FIG. 13D rectangular patterns are shown, with FIG. 13C depicting rounded rectangular (square) grating blocks, and FIG. 13D depicting circular grating blocks.

The HCM of the present disclosure may utilize any of the above forms of gratings and combinations thereof. Furthermore, the above examples illustrate that the present disclosure can be implemented across a broad range of known HCM grating configurations without departing from the teachings presented herein.

4. Applications for Color Changing Membranes 4.1 Temperature Induced Color Display A range of applications exist for the present disclosure with regard to sensing temperatures on both a micro and macro level. It should be appreciated that changing the temperature of the disclosed structure induces a color change because the flexible membrane has a different thermal expansion coefficient than the grating bars, whereby temperature changes induce mechanical deformation. Typically, the encapsulation material referred to as the flexible membrane (e.g., polymer) has a larger thermal expansion coefficient than HCM (e.g., silicon), accordingly the HCM period increases as temperature is increased, leading to a color shifting toward longer wavelengths (more red). Creating the structure with larger differences in the thermal expansion between the grating bars and the flexible membrane result in providing greater sensitivity to temperature changes.

4.2 Actively Color Controlled Display

Figure 14:
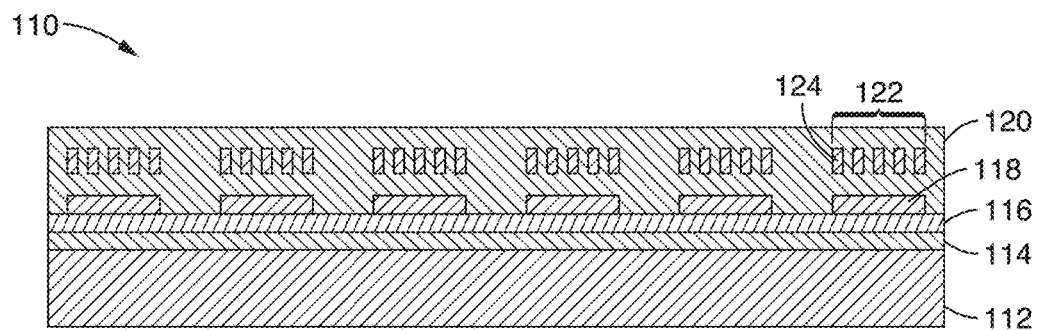
FIG. 14 is a cross sectional view of the schematic of the membrane with active color control, according to an embodiment of the present disclosure.

FIG. 14 illustrates an example embodiment 110 of an HCM membrane structure according to the present disclosure. In this example an electro-static MEMS structure is embedded under every pixel 124. It creates the deformation locally when a voltage is applied. Such deformation leads to the color change of the corresponding pixels. In membrane 110, the color of each individual pixel is actively controlled by embedding the microelectromechnical system (MEMS) structure underneath. By way of example and not limitation the flexible membrane is described as comprising PDMS. A carrier substrate is shown 112 upon which is a first metal layer 114, and a first PDMS layer 116. Another metal layer 118 is depicted with segments, thus first PDMS layer is sandwiched between two set of electrodes, exemplified as a common electrode 114, and any of the separate electrodes 118. An HCM grating 124 (of any desired geometry), and having a plurality of gratings 122, is depicted disposed within a second PDMS layer 120.

By applying a voltage between one of the separate electrodes 118, and the common electrode 114, electro-static forces will compress the thin film of PDMS layer 116, thereby changing the shape of the metastructure locally resulting in a change of display color for the pixel (e.g., pixel is associated with the area about separate electrode segment 118 and HCM 124.

Figure 15A:
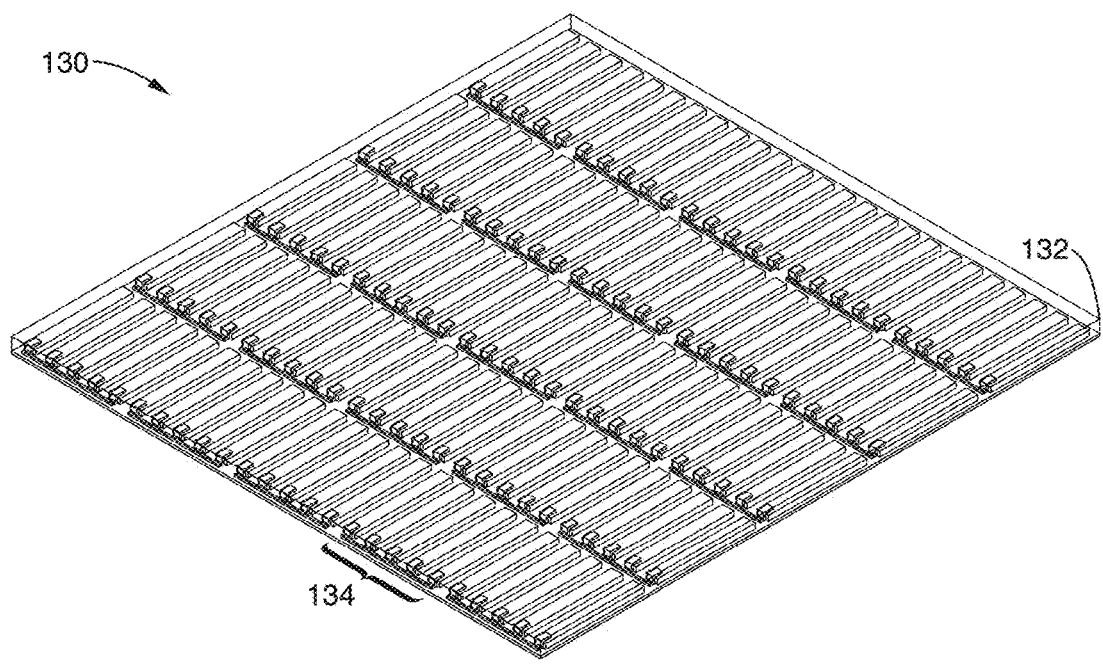
FIG. 15A through FIG. 15C are views of a display controlled by carrier injection, according to an embodiment of the present disclosure.
Figure 15B:
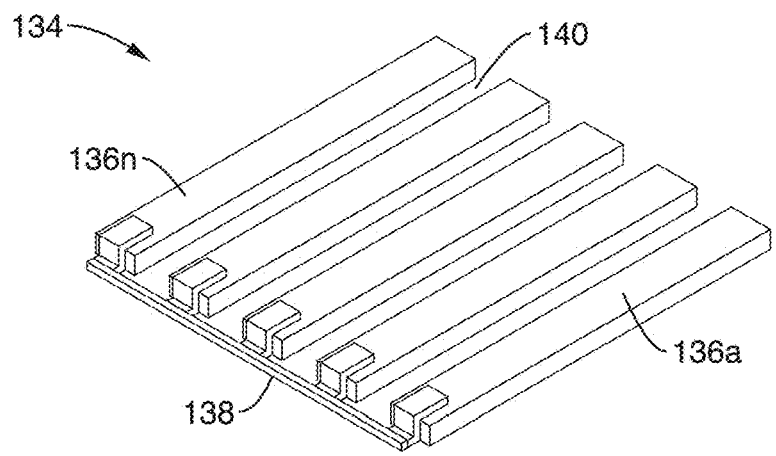
Figure 15C:
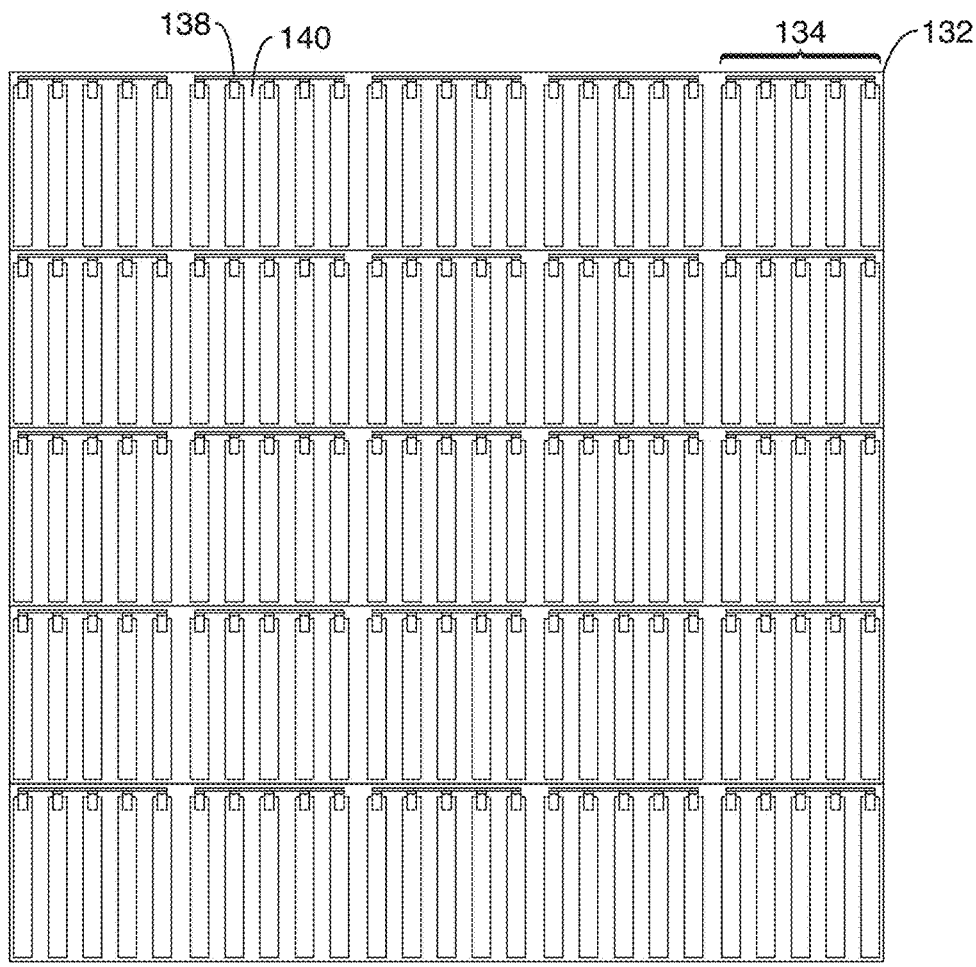

FIG. 15A through FIG. 15C illustrate an embodiment 130 of a color changing display using a tuning mechanism based on carrier injection. In FIG. 15A a membrane 132 is seen having groups of HCG grating bars 134 for each of a plurality of pixels. By adding the electrical contact to the HCMs, the carrier concentration of the semiconductor can be actively controlled, leading to the refractive index change, which results in tuning of the display color. In FIG. 15B an individual pixel is seen with its grating elements 136a through 136n and inter-grating spacing 140. The anode of each pixel is separately controlled to have distinctive colors. The cathodes for the grating elements of these pixels are connected to a common ground which controls current injection. In FIG. 15C a plurality of pixels are seen arranged in a two dimensional display.

4.3 Actively Controlled Beam Steering

The actively color controlled membrane can be used as a beam steering device for fixed wavelengths of incident light. With the fixed incidence angle and wavelength, the output angle will be changed as the metastructure period is varied by deformation. The actuation mechanism shown can also be applied in this beam steering device.

4.4 Passive Color Display for Micro-Labeling

Figure 16:
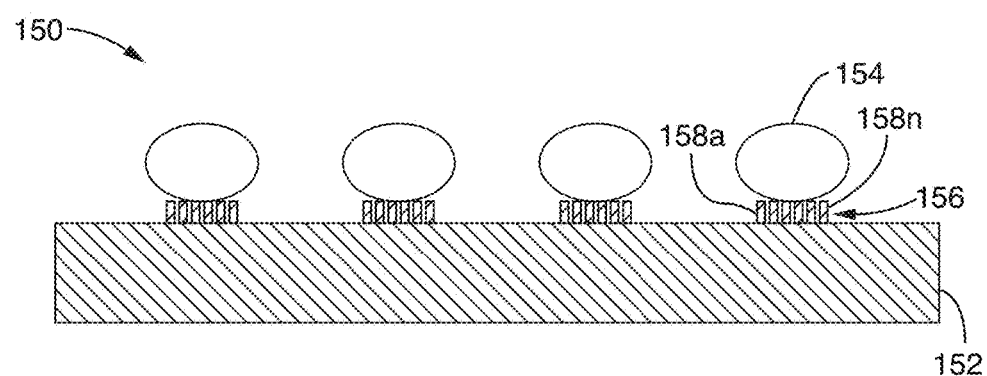
FIG. 16 is a cross-section view of a micro-labeling application in which a micro entity physically interacts with the HCG of the pixels thus providing color labeling of select micro entity attributes.

FIG. 16 illustrates an example embodiment 150 of a micro-labeling application. A form of labeling for micro entities can be performed according to the present disclosure by distinguishing varied mechanical, or thermal, response. The labeling is generated as the color of each individual pixel is sensitive to the mechanical, or thermal, stimulation on a micron scale. The micro entities 154, such as cells for biology applications, are attached to the pixels 156 by any desired means (e.g., chemical, physical, and/or optical). Each pixel is shown comprising a plurality of HCM grating bars 158a through 158n, which are depicted on a membrane 152. These micro entities have varied properties whose mechanical attributes result in creating an external stimulation upon pixels 156, yielding different deformation of the HCM pixels which translates into color variations in the pixels of the display. Therefore, the micro-entities (cells) are 'labeled' by the color coding of their mechanical property in their attachment to the display, which for example can be some form of micro assay, or micro array.

4.5 Passive Color Display for Mechanical Deformation Sensing

In another form of application the sensitivity of the flexible color changing metastructure to mechanical deformation is utilized. For example, the disclosed flexible color changing metastructure membrane can be used to coat (or cover) the surface(s) of one or more objects, thus providing a mechanism for detecting structural changes in the mechanical systems, such as bridges, buildings, aircraft, and the like.

4.6 Passive Color Display for Anti-Counterfeiting

The color controlled membrane can be embedded in paper currency or other anti-counterfeiting labels. The color pattern can be defined in micron scale. By twisting or stretching the membrane, the color pattern is changed correspondingly. Such property cannot be reproduced without the coding of the HCM geometry and the nano-fabrication production line. Additionally, it is easy to identify this anti-counterfeiting indicia with its changing visible color patterns. Therefore, it is promising technology for anti-counterfeiting applications.

From the description herein, it will be appreciated that the present disclosure encompasses multiple embodiments which include, but are not limited to, the following:

1. A photonic apparatus, comprising: (a) a high contrast metastructure (HCM) having a plurality of high index grating structures; and (b) a transparent flexible film coupled to said high contrast metastructure (HCM); (c) wherein said high index grating structures of said high contrast metastructure (HCM) are disposed on, or within, said transparent flexible film in a combination forming a photonic device; and (d) wherein said combination of high contrast metastructure (HCM) and said transparent flexible film are configured so that the size of low index gaps between adjacent high index grating structures changes in response to compressive strain or tensile strain which results in change of reflectance and transmission angles causing a color change in said photonic device.

2. The apparatus of any preceding embodiment, wherein said high contrast metastructure (HCM) has a period which approximates an optical wavelength of incident light, with a range of periods in which only $-1^{st}$ order and $0^{th}$ order reflections and refractions are subject to propagation diffraction, whereby said apparatus concentrates incident light power into high diffraction orders.

3. The apparatus of any preceding embodiment, wherein light power reflection and refraction is concentrated in the −1 order with other orders being fully or substantially canceled out.

4. The apparatus of any preceding embodiment, wherein said high index grating structures of said high contrast metastructure (HCM) have an index of refraction which is at least 1.5 times that of the surrounding low index material of said transparent flexible film.

5. The apparatus of any preceding embodiment, wherein said high index grating structures of said high contrast metastructure (HCM) have an index of refraction which is greater than double that of the surrounding low index material of said transparent flexible film.

6. The apparatus of any preceding embodiment, wherein said high index grating structures comprise a semiconductor material.

7. The apparatus of any preceding embodiment, wherein said high index grating structures are have a one dimensional or two dimensional distribution within said high contrast metastructure (HCM).

8. The apparatus of any preceding embodiment, further comprising electrodes coupled to each pixel and configured for actively controlling carrier concentration which results in refractive index changes which result in tuning of the display color.

9. The apparatus of any preceding embodiment, further comprising: an electro-static MEMS structures coupled to each pixel for converting an electrical input to a physical strain on said transparent flexible film; wherein said apparatus comprises a color controllable display.

10. The apparatus of any preceding embodiment, further comprising: an electro-static MEMS structures coupled to each pixel for converting an electrical input to a physical strain on said transparent flexible film; wherein said apparatus is configured for application over a vehicle or other device to be camouflaged, allowing electrical inputs to said electro-static MEMS structures to change color on said apparatus to blend into its surroundings.

11. The apparatus of any preceding embodiment, wherein said apparatus can be utilized for beam steering of fixed wavelength light.

12. The apparatus of any preceding embodiment, wherein said apparatus is configured for receiving micro scale entities on its individual pixels which create compressive strain or tensile strain thereon, arising from mechanical and/or thermal interaction with these individual pixels, resulting in color changes on the color controllable membrane which labels the micro scale entities.

13. The apparatus of any preceding embodiment, wherein said apparatus is configured as a flexible sheet, or coating, for application at a macro scale in which said color controllable membrane changes color in response to macro scale mechanical property sensing.

14. The apparatus of any preceding embodiment, wherein said transparent flexible film and said high contrast metastructure (HCM) have differing temperature coefficients of expansion, so that the wavelength of the HCM increases with increasing temperature; and wherein said apparatus is configured as a flexible sheet, or coating, applied to a macro scale structure in which said color controllable membrane changes color in response to sensing changes in temperature on the macro scale structure.

15. The apparatus of any preceding embodiment, wherein said apparatus is embedded in currency as an anti-counterfeiting indicia, in which the by twisting or stretching the currency, a color change is exhibited which is difficult to counterfeit without proper coding of HCM geometry and a nano-fabrication production line.

16. The apparatus of any preceding embodiment, wherein said transparent flexible film comprises a polymer.

17. The apparatus of any preceding embodiment, wherein said polymer comprises a polymeric organosilicon compound.

18. The apparatus of any preceding embodiment, wherein said polymeric organosilicon compound comprises polydimethylsiloxane (PDMS).

19. A photonic beam-steering apparatus, comprising: (a) a high contrast metastructure (HCM) having a plurality of high index grating structures; and (b) a transparent flexible film coupled to said high contrast metastructure (HCM); (c) wherein said high index grating structures of said high contrast metastructure (HCM) are disposed on, or within, said transparent flexible film in a combination forming a photonic device; and (d) wherein said combination of high contrast metastructure (HCM) and said transparent flexible film are configured for receiving light at a fixed wavelength and steering that light as width of low index gaps between adjacent high index grating structures changes in response to compressive strain or tensile strain which produces changes in reflectance and transmission angles.

20. A color changing display apparatus, comprising: (a) a high contrast metastructure (HCM) having a plurality of high index grating structures; and a transparent flexible film coupled to said high contrast metastructure (HCM); and (b) electrodes coupled to each pixel which are configured for actively controlling carrier concentration; (c) wherein said high index grating structures of said high contrast metastructure (HCM) and said electrodes are disposed on, or within, said transparent flexible film in a combination in which changes in carrier concentration result in refractive index changes that tune color at each pixel of the color changing display.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A photonic apparatus, comprising:
a high contrast metastructure (HCM) having a plurality of high index grating structures; and
a transparent flexible film coupled to said high contrast metastructure (HCM);
wherein said high index grating structures of said high contrast metastructure (HCM) are disposed on, or within, said transparent flexible film in a combination forming a photonic device; and
wherein said combination of high contrast metastructure (HCM) and said transparent flexible film are configured so that the size of low index gaps between adjacent high index grating structures changes in response to compressive strain or tensile strain which results in change of reflectance and transmission angles causing a color change in said photonic device.

2. The apparatus as recited in claim 1, wherein said high contrast metastructure (HCM) has a period which approximates an optical wavelength of incident light, with a range of periods in which only $-1^{st}$ order and $0^{th}$ order reflections and refractions are subject to propagation diffraction, whereby said apparatus concentrates incident light power into high diffraction orders.

3. The apparatus as recited in claim 2, wherein light power reflection and refraction is concentrated in the −1 order with other orders being fully or substantially canceled out.

4. The apparatus as recited in claim 1, wherein said high index grating structures of said high contrast metastructure (HCM) have an index of refraction which is at least 1.5 times that of the surrounding low index material of said transparent flexible film.

5. The apparatus as recited in claim 1, wherein said high index grating structures of said high contrast metastructure (HCM) have an index of refraction which is greater than double that of the surrounding low index material of said transparent flexible film.

6. The apparatus as recited in claim 1, wherein said high index grating structures comprise a semiconductor material.

7. The apparatus as recited in claim 1, wherein said high index grating structures are have a one dimensional or two dimensional distribution within said high contrast metastructure (HCM).

8. The apparatus as recited in claim 1, further comprising electrodes coupled to each pixel and configured for actively controlling carrier concentration which results in refractive index changes which result in tuning of the display color.

9. The apparatus as recited in claim 1, further comprising:
an electro-static MEMS structures coupled to each pixel for converting an electrical input to a physical strain on said transparent flexible film;
wherein said apparatus comprises a color controllable display.

10. The apparatus as recited in claim 1, further comprising:
an electro-static MEMS structures coupled to each pixel for converting an electrical input to a physical strain on said transparent flexible film;
wherein said apparatus is configured for application over a vehicle or other device to be camouflaged, allowing electrical inputs to said electro-static MEMS structures to change color on said apparatus to blend into its surroundings.

11. The apparatus as recited in claim 1, wherein said apparatus can be utilized for beam steering of fixed wavelength light.

12. The apparatus as recited in claim 1, wherein said apparatus is configured for receiving micro scale entities on its individual pixels which create compressive strain or tensile strain thereon, arising from mechanical and/or thermal interaction with these individual pixels, resulting in color changes on the color controllable membrane which labels the micro scale entities.

13. The apparatus as recited in claim 1, wherein said apparatus is configured as a flexible sheet, or coating, for application at a macro scale in which said color controllable membrane changes color in response to macro scale mechanical property sensing.

14. The apparatus as recited in claim 1:
wherein said transparent flexible film and said high contrast metastructure (HCM) have differing temperature coefficients of expansion, so that the wavelength of the HCM increases with increasing temperature; and
wherein said apparatus is configured as a flexible sheet, or coating, applied to a macro scale structure in which said color controllable membrane changes color in response to sensing changes in temperature on the macro scale structure.

15. The apparatus as recited in claim 1, wherein said apparatus is embedded in currency as an anti-counterfeiting indicia, in which the by twisting or stretching the currency, a color change is exhibited which is difficult to counterfeit without proper coding of HCM geometry and a nanofabrication production line.

16. The apparatus as recited in claim 1, wherein said transparent flexible film comprises a polymer.

17. The apparatus as recited in claim 16, wherein said polymer comprises a polymeric organosilicon compound.

18. The apparatus as recited in claim 17, wherein said polymeric organosilicon compound comprises polydimethylsiloxane (PDMS).

19. A photonic beam-steering apparatus, comprising:
a high contrast metastructure (HCM) having a plurality of high index grating structures; and
a transparent flexible film coupled to said high contrast metastructure (HCM);
wherein said high index grating structures of said high contrast metastructure (HCM) are disposed on, or within, said transparent flexible film in a combination forming a photonic device; and
wherein said combination of high contrast metastructure (HCM) and said transparent flexible film are configured for receiving light at a fixed wavelength and steering that light as width of low index gaps between adjacent high index grating structures changes in response to compressive strain or tensile strain which produces changes in reflectance and transmission angles.

20. A color changing display apparatus, comprising:
a high contrast metastructure (HCM) having a plurality of high index grating structures; and
a transparent flexible film coupled to said high contrast metastructure (HCM); and
electrodes coupled to each pixel which are configured for actively controlling carrier concentration;
wherein said high index grating structures of said high contrast metastructure (HCM) and said electrodes are disposed on, or within, said transparent flexible film in a combination in which changes in carrier concentration result in refractive index changes that tune color at each pixel of the color changing display.

* * * * *